T. L. BURTON.
BRAKE HEAD ADJUSTER.
APPLICATION FILED APR. 27, 1917.
1,349,407.
Patented Aug. 10, 1920.
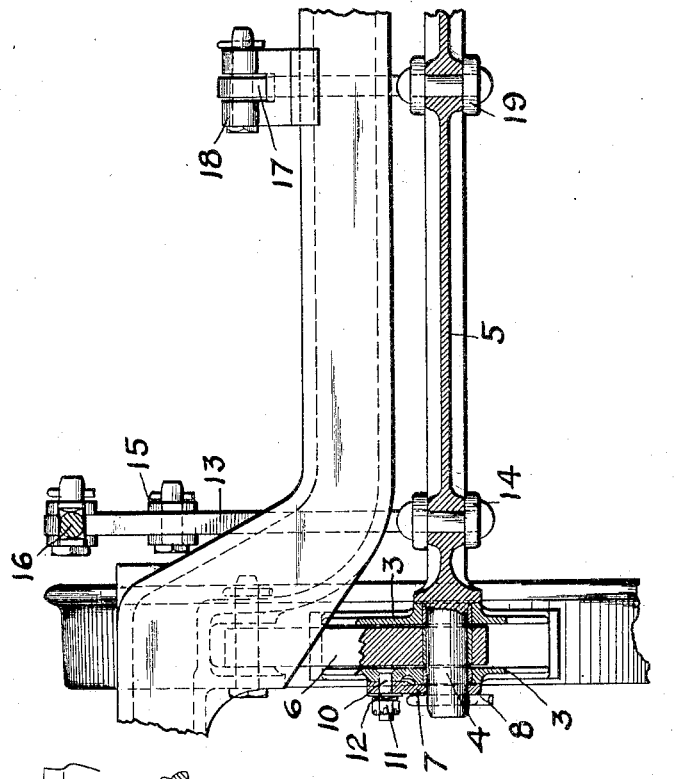
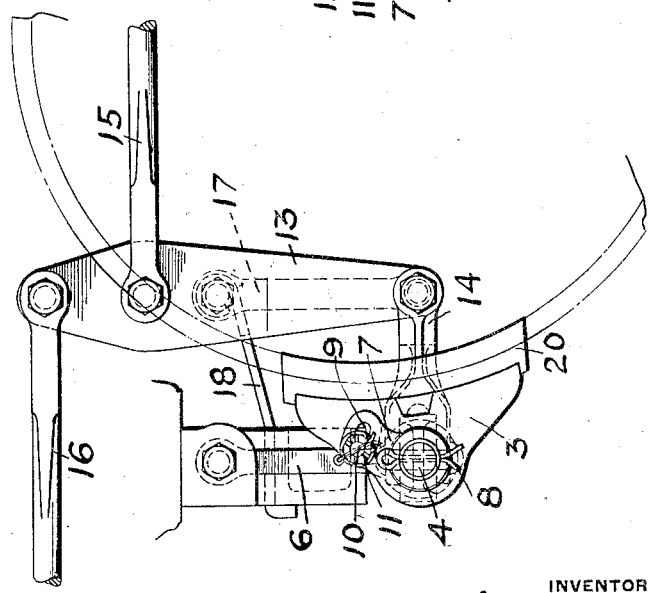
INVENTOR
Thomas L. Burton
by Edward H. Wright
Atty.

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-HEAD ADJUSTER.

1,349,407.  Specification of Letters Patent.  Patented Aug. 10, 1920.

Application filed April 27, 1917. Serial No. 164,846.

*To all whom it may concern:*

Be it known that I, THOMAS L. BURTON, a citizen of the United States, residing at St. Louis, in the State of Missouri, have invented a certain new and useful Improvement in Brake-Head Adjusters, of which improvement the following is a specification.

This invention relates to adjusting devices for brake shoes, and has for its object to provide an improved friction device for connecting a brake head to a brake beam, where the brake head is pivotally mounted on the brake beam, to maintain the shoe substantially concentric with the periphery of the wheel when released and under the various conditions of wear of the brake shoe and wheel.

My present improvement relates more particularly to that type of brake design in which the brake head and shoe is pivotally mounted on the trunnion of the brake beam, and it comprises a friction member rigidly mounted with reference to the brake beam, and having a frictional engagement through a limited movement relative to the brake head. These and other features of my improvement will now more fully appear from the following detailed description of a preferred construction, the novel features being set forth in the claims.

In the accompanying drawing: Figure 1 is a side elevation; and Fig. 2, a transverse section of a brake head and beam connection embodying my improvement.

I have shown my improvement in connection with a clasp brake design in which the brake head, 3, is pivotally mounted on the trunnion, 4, at the end of brake beam, 5, which is supported by means of the hanger, 6, also pivoted to said trunnion and to the truck frame.

A friction member, such as the arm, 7, is rigidly connected to the brake beam, as by means of the cotter pin, 8, and is provided with a slot, 9, through which extends a bolt, 10, fixed in the brake head, 3, and having a clamping nut, 11, and friction washers, 12, for producing a frictional resistance to relative movement between the friction arm and the brake head. The brake beams may be operated by any suitable design of brake rigging, such as truck lever, 13, pivotally connected at its lower end to a bracket or jaw, 14, on the brake beam, and having pull rods, 15 and 16, for connecting said lever with the adjoining truck levers, as in ordinary clasp brake designs.

An additional hanger, 17, may be pivotally suspended from an arm, 18, rigidly supported on the truck frame at the middle or intermediate portion of the brake beam, and pivotally connected at its lower end to the jaw, 19, of said brake beam. This additional hanger, 17, is located in the same transverse plane as the truck levers, and being of substantially the same length as the hangers, 6, it coöperates with the other hangers to maintain the brake beam in a substantially horizontal position during its swinging movement in moving toward the wheels in applying the brakes, and away from the wheels in releasing the same.

When the brake shoe, 20, attached to the brake head, is new and unworn, the bolt, 10, on the brake head, 3, may occupy a position at the left end of the slot, 9, and the brake shoe will be concentric with the periphery of the wheel, in the normal release position of the brake shoe. The shoe also obtains a full bearing against the wheel when moved to the applied position, as shown in Fig. 1.

As the shoe wears, however, its position relative to the brake beam will be changed when the shoe is brought against the wheel with a full bearing, and the brake head will be rotatably adjusted on the brake beam, during which movement the bolt, 10, will be moved along the slot in the friction arm, 7, so as to maintain the position of the shoe substantially concentric to the wheel. The frictional resistance between the arm, 7, and the brake head, 3, is sufficient to prevent relative movement between these parts when the brake is released, but when the shoe is brought up against the wheel, if it should not be entirely concentric therewith, the brake applying force in bringing the shoe into full bearing upon the wheel will overcome the frictional resistance between the brake head and the arm, 7, and cause the head to be rotatably adjusted upon the brake beam trunnion. The frictional resistance then holds these parts in the same relative positions until further adjustment becomes necessary.

Having now described my invention, what I claim as new and desire to secure by Letters Patent is:

1. In a brake shoe adjuster, the combination of a brake beam, a brake head pivotally mounted on said beam, an arm rigidly attached to turn with said beam, and a frictional connection between said arm and the brake head.

2. In a brake shoe adjuster, the combination of a brake beam having a trunnion, a brake head pivoted on said trunnion, an arm rigidly attached to turn with said beam, and extending alongside of the brake head, and means for clamping the arm against the brake head for producing a frictional resistance.

3. In a brake shoe adjuster, the combination of a brake beam having a trunnion, a brake head pivoted on said trunnion, an arm attached to said beam and having a slot, a bolt carried by the brake head and extending through said slot, and a clamping nut on said bolt.

4. In a brake shoe adjuster, the combination of a brake beam having a trunnion, a brake head pivoted on said trunnion, an arm rigidly attached to turn with said beam, a hanger pivoted on said trunnion, said beam having an intermediate jaw, a hanger pivotally connected to said intermediate jaw, and a frictional connection between said arm and the brake head.

In testimony whereof I have hereunto set my hand.

THOMAS L. BURTON.